July 25, 1939.    H. LAWARREÉ    2,167,404
PROCESS FOR THE MANUFACTURE OF CAUSTIC SODA
Filed Nov. 16, 1936
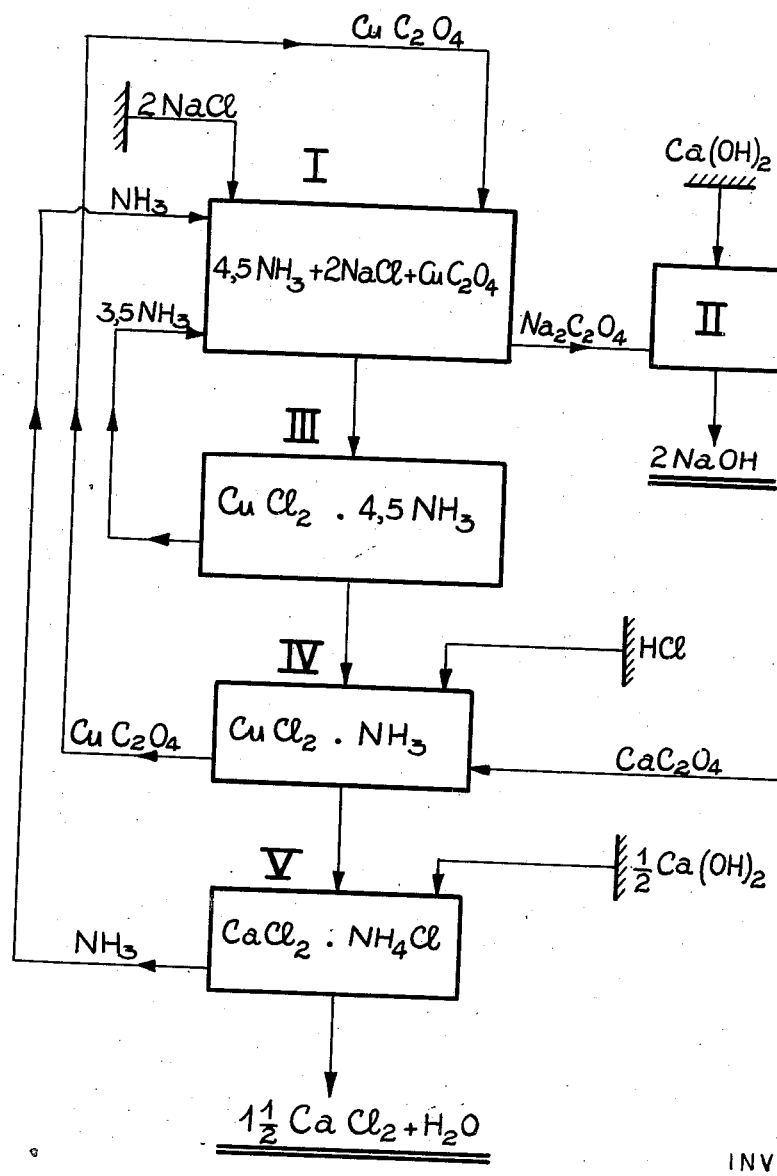
INVENTOR
HENRI LAWARREE
By Young, Emery & Thompson
ATTYS.

Patented July 25, 1939

2,167,404

UNITED STATES PATENT OFFICE 2,167,404

PROCESS FOR THE MANUFACTURE OF CAUSTIC SODA

Henri Lawarree, Brussels, Belgium

Application November 16, 1936, Serial No. 111,144
In France December 18, 1935

9 Claims. (Cl. 23—184)

The invention relates to a process for the manufacture of caustic soda, starting from a soluble sodium salt, such, for example, as the chloride. In its complete and preferred form, it contemplates a cyclic process, whereby caustic soda is produced continuously, in a relatively simple and economic manner, the starting materials being recovered or regenerated, to a considerable extent, for re-use. The invention comprises the process, and the various novel steps thereof, as hereinafter set forth.

Briefly, the invention is based on the fact that sodium oxalate can be produced, as a precipitate, by reaction between the initial sodium salt and a metallic oxalate, particularly copper oxalate, in a solvent for the metallic oxalate, the solvent being an alkali, which for the best working of the process, should be a volatile one, to enable it to be readily recovered. The solvent also should be such that it is capable of being separated from the products of the re-action above mentioned; the best material for the purpose with which I am acquainted is ammonia. The sodium oxalate thus produced may later be causticised to form caustic soda while the volatile alkali may be recovered, and the initial metallic oxalate regenerated for further use in the process. However the sodium oxalate may when desired, be obtained as a new product by the novel steps which result in its production as described.

Hereafter, whenever, for simplicity, ammonia is referred to, in general descriptions of the process, it will be understood that equivalent volatile solvents are meant to be included, and whenever copper oxalate is referred to, similarly, it should be understood that equivalent metallic oxalates are included.

In the preferred cyclic process the reaction of the initial sodium salt, preferably sodium chloride, with copper oxalate in ammoniacal solution produces sodium oxalate, as stated above, as a precipitate which is removed by filtration. The causticising of this with lime produces caustic soda in solution, (which can be concentrated) and calcium oxalate, which precipitates and is filtered off. The filtrate remaining from the first operation, after the removal of the sodium oxalate, contains a copper salt which, until a certain amount of de-ammoniation has been accomplished, remains in ammoniacal solution.

This salt, (a compound of copper and chlorine, together with ammonia), becomes insoluble when the ammonia is removed, but may be dissolved by hydrochloric or other suitable acid. Reaction between such copper salt, in solution, and the calcium oxalate, obtained from the causticisation operation will produce copper oxalate, which may be recovered by filtration and used again in the process. The ammonia is recovered, chiefly by distillation, at a suitable point in the process, as will be described, and may be returned to the cycle.

Referring, now, to one manner of carrying out the process, in the first operation fresh copper oxalate, which may contain a little oxalate of calcium, may be mixed in a solution of chloride of sodium, in the presence of sufficient ammonia to dissolve the copper oxalate. After cooling, the oxalate of sodium formed is filtered out and washed on the filter. The yield is greater in proportion as the initial solution is more concentrated, and as the temperature at the moment of the filtration of the sodium oxalate is lower.

This oxalate is later causticised by lime, preferably an excess of lime, with the formation of caustic soda and calcium oxalate. The caustic soda formed is filtered, and, if calcium carbonate is contained in the excess of lime, it may be neutralized by means of an acid which forms a soluble salt with the calcium. The neutralizing of the calcium oxalate may be done in a little water, by hydrochloric acid, which forms soluble calcium chloride with the calcium. Then, in this form of the process, the neutral oxalate of calcium thus obtained and the alkaline solution of the metallic (copper) salt, resulting from the initial filtration of the sodium oxalate, are brought together. The mixture is boiled, and the free volatile alkali (ammonia) distills off first; the distillation can be facilitated by the application of reduced pressure.

When certain metallic oxalates are used, (including copper oxalate), a part of the volatile alkali may be chemically combined with the soluble metallic salt resulting from the formation of the sodium oxalate. This combined alkali (ammonia) can be later removed, and all of the alkali returned into the cycle.

When, in the course of this boiling operation, there remains almost none of the ammonia in the solution, the latter may be neutralized, and furthermore, the formation of basic metallic salts, such as, for example, the oxychloride, counteracted, by a sufficient acidification, by means of an acid which forms a soluble salt with calcium. The acidifying renders the metallic (copper) salt soluble, (it having been rendered insoluble by the removal of ammonia), and this soluble salt reacts with the calcium oxalate, by double decomposition, to regenerate the initial metallic (copper) oxalate, and form a soluble salt of calcium, corresponding to the initial sodium salt, this occuring after the liberation of the ammonia.

According to one detail of the invention, the quantitative character of the regeneration of metallic oxalate is promoted by employing an excess of calcium oxalate, relatively to the stoichiometric quantities involved, which excess remains in the cycle, and the presence of which is not harmful in the alkaline stage of the process, that is to say, in the first phase of the formation of sodium oxalate.

The neutralizing of the solution, referred to above, by acidification, is thought to destroy the last of the cupro-ammoniac chloride, and, in the presence of the excess of calcium oxalate employed, the transformation of simple copper chloride into oxalate is achieved quite completely.

As stated the ammonia is recovered and returned to the cycle, and, finally, the copper oxalate, containing a little permanent oxalate of calcium, is removed by filtration, and returned to the cycle. The filtrate or solution of soluble calcium salt, (chloride of calcium), is discharged, after having removed therefrom, by any known means, the traces of salts of the metal of the initial oxalate, (copper oxalate), as well as the volatile alkali, (ammonia), which this solution may still contain. For example, to remove the contained ammonia, after filtration of the regenerated copper oxalate, a little lime is added to the calcium chloride solution, and the residual ammonia removed by distillation.

By the described proceeding, one maintains in cyclic process practically all of the copper-oxalate and ammonia employed, with the introduction only of lime, chloride of sodium and a little acid such as hydrochloric, caustic soda being produced, and the only by-product discharged being the chloride of calcium, of which one can, by simple means, extract the cyclic elements of value.

It will be noted that the complete, cyclic, process, embodies four stages or operations, namely, 1, preparation of sodium oxalate, 2, de-ammoniation of the filtrate, 3, causticisation of the sodium oxalate, and, 4, regeneration of copper oxalate, these operations comprising a closed cycle.

It will also be noted that, in the particular manner of operation described above, the regeneration of the copper oxalate was initiated by boiling together the oxalate of calcium, (which had been neutralized by acid), with the alkaline solution of the soluble copper salt, the free ammonia distilling off first, acid being added when only a little ammonia remains undistilled. Thus in this manner of procedure, the second and fourth operation referred to above were combined. A preferable procedure is to distill off the ammonia before commencing the regeneration of the copper oxalate, as in the example of a preferred method, presently to be described. The cupro-ammoniac chloride formed by the first reaction, when sodium oxalate is precipitated, remains in solution, but the liberation of ammonia from this compound during heating produces an insoluble copper salt, which will not react with the calcium oxalate until it, (the copper salt), has been dissolved, completely or partially, by an acid, such as hydrochloric; the ammonia, must be largely removed, and the system rendered acid, before this reaction of the copper salt and the calcium oxalate can take place. Therefore it is thought desirable to distill off the ammonia, and later to dissolve the insoluble copper salt before bringing it and the calcium oxalate together to cause the regeneration reaction.

In the preparation of the sodium oxalate it has been found convenient to employ an ammoniacal solution of copper oxalate, which is caused to react with sodium chloride or a concentrated solution thereof. An alternative method consists in ammoniating the sodium chloride solution containing copper oxalate. As previously stated, the more concentrated the original solution, the higher is the yield of sodium oxalate, and in practice the quantity of water employed should not exceed that required to dissolve the sodium chloride at normal temperature.

The second operation, namely, the de-ammoniation of the filtrate, may be carried out by simple distillation, if desired, under reduced pressure, or by the use of live steam, the injection of steam facilitating the distillation of ammonia when some of the same is chemically combined with the copper chloride. It appears that the effect of the steam is to transform the cupro-ammoniac chloride (such as $CuCl_2NH_3$) to basic copper chloride, with formation of ammonium chloride, from which the ammonia is readily removed.

The causticisation operation may be conducted in known manner, care being taken to ensure the conversion of all the sodium oxalate to sodium hydroxide, while avoiding the presence of free lime in the calcium oxalate which is produced and filtered off. The causticising is preferably conducted in two stages, with a considerable excess of lime in the second stage, there having been an excess of sodium oxalate in the first stage. The filtrate may be concentrated in known manner, and should be allowed to stand for some time. Any traces of impurities present settle out and may then be removed by filtration, centrifuging and the like. In the regeneration of the copper oxalate any acid yielding a soluble calcium salt may be employed.

The appended flow-sheet will facilitate comprehension of the process.

The following examples serve to illustrate, but not to restrict the invention:—

Example 1

138 parts by weight of dry copper oxalate $2(CuC_2O_4)H_2O$ are triturated with 385 parts by weight of 26% brine and gaseous ammonia passed into the mixture until the absorption amounts to 88 parts by weight, care being taken that the temperature does not exceed 50° C. During the absorption the mixture thickens and must be agitated. As the reaction proceeds, an intense blue colour develops and a crystalline sodium oxalate precipitates. Filtration is effected after cooling to 15° C. The resulting sodium oxalate is washed with the least quantity of water necessary to remove the blue colour of the copper as completely as possible.

The combined filtrate and washings, approximately 1150 parts by weight, are heated and steam passed in until the liberation of ammonia substantially ceases and the copper salt has separated as a blue green solid. The weight amounts to about 600 parts. After allowing to settle, the supernatant liquid is decanted as completely as possible. About 106 parts of a 32% solution of hydrochloric acid are used to dissolve the solid, and when solution is complete, moist calcium oxalate obtained from the causticisation of sodium oxalate and corresponding to a dry weight of 126 parts is added. When the solution is found to contain substantially all the calcium, the mixture is cooled and filtered. The solid copper oxalate is washed until the washings are free from chlorine and either dried or retained moist for a second operation.

The sodium oxalate resulting from the first operation may be dried or, if desired, retained in the form of moist cake. The yield in the dry state amounts to 109 parts by weight. For the causticisation process 63 parts by weight of quicklime are slaked in approximately 550 parts by weight of the washings subsequently obtained and the resulting milk of lime boiled. An excess of sodium oxalate is meantime treated with 550 parts by weight of the above washings and the mixture heated and filtered. The resulting filtrate is boiled and introduced with stirring into the boiling milk of lime. After boiling for 10 minutes the precipitate is allowed to settle until 700 parts by weight of clear supernatant liquid can be decanted. The decanted liquid is again saturated with sodium oxalate filtered and returned to the causticising mixture. In this manner 100 parts by weight of sodium oxalate in solution are caused to react with the lime. The mixture is again boiled with stirring for ½ hour and then cooled to —5° C. with continuous stirring. The precipitated calcium oxalate together with the excess lime is filtered off and the filter cake, without washing is treated with a filtered solution consisting of 1000 parts of water and 60 parts by weight of sodium oxalate. After boiling for 1 hour the mixture which is agitated by stirring or other means is cooled to 15° C. and filtered without further cooling. The resulting filtrate constitutes the washings referred to above which were employed for slaking the lime and for the extraction of the sodium oxalate. The filter cake is washed with the minimum quantity of water necessary to remove substantially all the caustic soda and sodium oxalate contained therein and finally with the acid liquors from the filtration of the copper-oxalate. The resulting calcium oxalate free from caustic soda and calcium carbonate is employed without washing for the treatment of the product of deammoniation.

The filtrate from the causticisation of the sodium oxalate with milk of lime is concentrated until the caustic soda content amounts to 40% by weight. The solution is then allowed to cool and stand until any sodium oxalate present separates completely. The final product is obtained by decanting, centrifuging or filtering through carbon plates or Monel metal gauze.

Example 2

138 parts by weight of copper oxalate are dissolved in 373 parts by weight of ammonia liquor containing 23.6% of ammonia. 100 parts of solid salt are then added in small quantities at a time with sufficient cooling to keep the temperature at or below 45° C. When the addition of the salt is complete the subsequent operations follow as described in Example 1.

Example 3

Ammonia is recovered from the filtrate obtained after separation of the sodium oxalate by vacuum distillation at about 60° C. The residue in the distillation vessel is employed as described in Example 1.

Example 3a

Ammonia is recovered from the filtrate by evaporation to about ⅜ of the original volume under vacuum and the last part of the ammonia removed by live steam. The residue in the distillation vessel is employed as described in Example 1.

Example 4

As an alternative to the mode of working described in Examples 1 and 3, calcium oxalate (dry weight 126 parts) obtained from the causticisation of a previous batch of sodium oxalate is added to 1150 parts by weight of the filtrate resulting from the separation of sodium oxalate. Ammonia is then removed and the residual mixture is acidified and worked up as described in Example 1.

Example 5

The process is conducted in accordance with any of the foregoing methods, but instead of 106 parts by weight of 32% hydrochloric acid, 80 parts by weight of nitric acid (specific gravity 1.40) are employed. The acid mixture is worked up in the manner previously described.

Example 6

Sodium oxalate is prepared as in Example 1, and the resulting filtrate acidified by means of nitric acid (specific gravity 1.40) without first recovering the ammonia. Calcium oxalate is then added and the process continued as described in Example 1, the final waste liquors being employed for the manufacture of ammonium nitrate.

Example 7

Alternatively sodium oxalate is prepared as in Example 1, and ammonia partially recovered from the resulting filtrate. The remaining liquid is acidified by an excess of nitric acid (specific gravity 1.40). Calcium oxalate is added and the process completed. The waste liquors are again employed for the manufacture of ammonium nitrate.

Example 8

The process is carried out as described in Example 1, but the product remaining after the removal of ammonia is acidified without decantation and the acid liquor treated with calcium oxalate corresponding to a dry weight of 126 parts. The process is then completed as in Example 1.

Example 9

The first stages of the process are carried out as described in the foregoing examples, but for the causticisation of the sodium oxalate 63 parts by weight of lime are made into a milk with 1020 parts by weight of the filtrate obtained as described below and boiled. 70 parts by weight of dry sodium oxalate are then added in small quantities in the course of half an hour. When the addition is complete, the mixture is cooled with agitation. The process is completed as in Example 1, the cake obtained by filtration of the above mixture being treated with 1060 parts by weight of an aqueous solution of sodium oxalate containing 60 parts by weight of the oxalate. The resulting filtrate forms the medium mentioned above for the preparation of the milk of lime.

Example 10

The process is carried out as in Example 1, but for the causticisation operation a slurry is prepared consisting of approximately 1030 parts by weight of a saturated solution containing 70 parts by weight of sodium oxalate in suspension.

The slurry is heated and stirred while 63 parts by weight of lime are added. When the addition is complete the mixture is allowed to cool with agitation and the process completed in accordance with Example 1. The filtrate from the treatment of the cake of calcium oxalate provides the medium for the preparation of the above sodium oxalate slurry.

*Example 11*

The process is carried out as described in any of the foregoing examples, but after causticisation of the sodium oxalate, the resulting mixture is filtered without previous cooling and/or refrigeration. The cake and filtrate are subsequently treated in accordance with Example 1.

*Example 12*

The process is carried out as described in Example 1, but for the causticisation 1100 parts by weight of a slurry consisting of 70 parts by weight of sodium oxalate, suspended in 1030 parts by weight of a solution saturated with the same at 15° C. are treated in a ball mill with 63 parts by weight of lime. After three hours ball milling, the mixture is filtered and the filtrate concentrated as in Example 1. The filter cake without washing is again treated in a ball mill with 1060 parts by weight of a slurry composed of 1030 parts by weight of a solution saturated with sodium oxalate at 15° C. and containing 30 parts by weight of the same in suspension. After ball milling for 3 hours the mixture is filtered, the filtrate providing the medium for the preparation of the slurry for the first operation described above.

As a result of operation such as above described in Example 1, for instance, a yield of sodium oxalate amounting to 98% of the theoretical has been obtained, while it has been found that the copper oxalate recovery may amount to 99.5% of the theoretical.

In regard to the metallic oxalate which takes part in the initial reaction with the soluble sodium salt (such as sodium chloride), copper oxalate has been found to be markedly the best of the metallic oxalates tried, from both the technical and economic points of view. Others, such as zinc oxalate, may be used, with less efficiency. It may be said that the oxalate must be one which is soluble in the solution of the volatile alkali (such as ammonia); that the soluble salts of the metal of such oxalate, which may be formed in the process, must be capable of undergoing a double decomposition with calcium oxalate, (that is, where the full cyclic process, with regeneration of the metallic oxalate, is considered essential); and that the soluble salt of the metal of such oxalate must be capable of being separated from the volatile alkali. Or, to consider the required properties of a metallic oxalate, to enable it to be used in the process, from a somewhat different point of view, it must be more soluble than sodium oxalate in the presence of the volatile alkali, and less soluble than calcium oxalate in a faintly acid solution.

As to the alkali solvent, preferably volatile ammonia, considering the question of cost as well as efficiency, seems much the best of those known, but others may be used, with greater or less success. Also as to the initial sodium salt used, others besides the chloride can be used, such as the nitrate, etc. provided that the acid of such salt forms a soluble salt with calcium. And as to the acid used to dissolve the basic copper chloride formed after the distillation of the ammonia, any acid may be employed which yields a soluble calcium salt.

It should be observed that the invention is not limited strictly to the exact details of the particular steps and operations which have been described by way of example, except so far as is required by the appended claims.

What I claim is:

1. A process for the manufacture of caustic soda, which comprises bringing together a solution, containing ammonia, of a soluble sodium salt, the acid of which forms a soluble salt with calcium, and a metallic oxalate which is soluble in the said solution and the soluble salts of the metal of which are capable of undergoing a double decomposition reaction with calcium oxalate, and of being separated from such ammonia, and thereby forming sodium oxalate as a precipitate in a solution containing a salt of the metal of said metallic oxalate; removing the sodium oxalate, and causticising it to produce caustic soda and calcium oxalate; separating out the said ammonia, and regenerating the initial metallic oxalate by reaction of the calcium oxalate with a solution containing the salt of the metal of said metallic oxalate which remained after the said removal of sodium oxalate.

2. A process for the manufacture of caustic soda, which comprises causing a soluble sodium salt the acid of which forms a soluble salt with calcium to react with copper oxalate in ammoniacal solution to produce sodium oxalate, removing the latter, causticising it to form caustic soda and calcium oxalate, recovering the ammonia, and regenerating the initial copper oxalate by reaction of the calcium oxalate with a solution containing the copper salt which remained after the said removal of sodium oxalate.

3. A process for the manufacture of caustic soda which comprises, bringing together a solution, containing ammonia, of a soluble sodium salt, the acid of which forms a soluble salt with calcium, and a metallic oxalate which is soluble in the said solution and the soluble salts of the metal of which are capable of undergoing a double decomposition reaction with calcium oxalate, and of being separated from said ammonia, and thereby forming sodium oxalate as a precipitate in a solution containing a salt of the metal of said metallic oxalate; removing the sodium oxalate, and causticising it to produce caustic soda and calcium oxalate; recovering the said ammonia, and regenerating the initial metallic oxalate by reaction of the calcium oxalate with a solution containing the salt of the metal of said metallic oxalate which remained after the said removal of sodium oxalate.

4. A process for the manufacture of caustic soda, which comprises, causing a soluble sodium salt the acid of which forms a soluble salt with calcium to react with copper oxalate in ammoniacal solution to produce sodium oxalate as a precipitate in a solution containing a copper salt; filtering out the sodium oxalate, causticising it to produce caustic soda and calcium, oxalate; recovering the ammonia, and regenerating the copper oxalate by double decomposition of the calcium oxalate with the said copper salt.

5. A process for the manufacture of caustic soda, which comprises, causing a soluble sodium salt the acid of which forms a soluble salt with calcium to react with copper oxalate in ammoniacal solution to produce sodium oxalate as a precipitate in a solution containing a copper salt;

filtering out the sodium oxalate, causticising it to produce caustic soda and calcium oxalate; and carrying out the following steps with the filtrate remaining after the removal of sodium oxalate, namely, distilling ammonia therefrom, acidifying with an acid which forms a soluble calcium salt, and regenerating the copper oxalate by double decomposition of the calcium oxalate with the copper salt in solution in said filtrate.

6. A process for the manufacture of caustic soda, which comprises, bringing together a solution, containing ammonia, of a soluble sodium salt, the acid of which forms a soluble salt with calcium, and a metallic oxalate which is soluble in the said solution and the soluble salts of the metal of which are capable of undergoing a double decomposition reaction with calcium oxalate, and of being separated from said ammonia, and thereby precipitating sodium oxalate in a solution containing a salt of the metal of said metallic oxalate; filtering out the sodium oxalate, causticising it to produce caustic soda and calcium oxalate; and carrying out the following steps with the filtrate remaining after the removal of sodium oxalate, namely, distilling the ammonia therefrom, acidifying with an acid which forms a soluble calcium salt, and regenerating the initial metallic oxalate by reaction of the calcium oxalate with the salt of the metal of said metallic oxalate in solution in said filtrate.

7. A process for the manufacture of caustic soda which comprises causing a soluble sodium salt the acid of which forms a soluble salt with calcium to react with copper oxalate in ammoniacal solution, to produce sodium oxalate as precipitate, and removing the latter; heating the remaining solution and passing steam therein to distil ammonia therefrom; dissolving with an acid which forms a soluble calcium salt, the solid copper compound formed in the filtrate after removal of the ammonia; causticising the sodium oxalate to form caustic soda in solution with calcium oxalate precipitated therein, and regenerating copper oxalate by causing reaction to take place between the calcium oxalate and the said dissolved copper compound.

8. A process for the manufacture of caustic soda which comprises causing a soluble sodium salt the acid of which forms a soluble salt with calcium to react in a solution containing ammonia with a metallic oxalate which is soluble in the said solution and the soluble salts of the metal of which are capable of undergoing a double decomposition reaction with calcium oxalate, and of being separated from said ammonia, and thereby forming sodium oxalate as a precipitate in a solution containing a salt of the metal of said metallic oxalate, and removing the sodium oxalate; distilling the volatile alkali from the solution remaining; dissolving, with an acid which forms a soluble calcium salt, the solid compound of the metal of said metallic oxalate formed in the solution after the removal of the ammonia; causticising the sodium oxalate to form caustic soda in solution with calcium oxalate precipitated therein; and regenerating the initial metallic oxalate by causing reaction to take place between the calcium oxalate and the said dissolved metallic compound.

9. A process for the manufacture of caustic soda which comprises bringing together a solution, containing ammonia, of a soluble sodium salt, the acid of which forms a soluble salt with calcium, and a metallic oxalate which is characterised by being more soluble than sodium oxalate in the presence of the said ammonia, and less soluble than calcium oxalate in a slightly acid solution, and thereby precipitating sodium oxalate in a solution containing a salt of the metal of said metallic oxalate; removing the sodium oxalate and causticising it to produce caustic soda and calcium oxalate; and carrying out the following steps with the solution remaining after the removal of sodium, oxalate, namely, distilling the ammonia therefrom, acidifying with an acid which forms a soluble calcium salt, and regenerating the initial metallic oxalate by double decomposition of the calcium oxalate with a salt of the metal of said metallic oxalate contained in said solution.

HENRI LAWARREE.